US009471672B1

(12) United States Patent
Walters et al.

(10) Patent No.: US 9,471,672 B1
(45) Date of Patent: Oct. 18, 2016

(54) RELEVANCE SORTING FOR DATABASE SEARCHES

(75) Inventors: Edward J. Walters, Alexandria, VA (US); Phillip J. Rosenthal, Washington, DC (US)

(73) Assignee: FASTCASE, INC., Washington, DC (US)

( * ) Notice: Subject to any disclaimer, the term of this patent is extended or adjusted under 35 U.S.C. 154(b) by 0 days.

(21) Appl. No.: 09/707,911

(22) Filed: Nov. 8, 2000

Related U.S. Application Data

(60) Provisional application No. 60/164,549, filed on Nov. 10, 1999.

(51) Int. Cl.
G06F 17/30 (2006.01)

(52) U.S. Cl.
CPC ... *G06F 17/30728* (2013.01); *G06F 17/30864* (2013.01)

(58) Field of Classification Search
CPC .................. G06F 17/30014; G06F 17/3005; G06F 17/30716; G06F 17/30728; G06F 17/30864; G06F 7/24; G06F 7/22
USPC ......... 707/7, 100, 10, 3, 4, 5, 2, 104.1, 736, 707/758, 723, 800, 933, 999.007, 726–727, 707/748–750, 752–754, 769, 942, 755, 767, 707/757, 771, 939; 715/200, 205; 705/1, 705/1.1; 717/923, 942, 999.006, 999.007
See application file for complete search history.

(56) References Cited

U.S. PATENT DOCUMENTS 4,873,625 A * 10/1989 Archer et al. ................ 707/752
5,157,783 A    10/1992 Anderson et al.
5,465,371 A * 11/1995 Fujii et al. ........................ 707/7
5,642,471 A *  6/1997 Paillet ............................. 706/47
5,680,607 A * 10/1997 Brueckheimer ................. 707/7
5,794,236 A    8/1998 Mehrle
5,802,515 A *  9/1998 Adar et al. .................... 707/723
5,832,476 A * 11/1998 Tada et al. ....................... 707/2
5,953,718 A *  9/1999 Wical .............................. 707/5
5,960,429 A *  9/1999 Peercy et al. .................... 707/5
5,991,751 A * 11/1999 Rivette et al. ................... 707/1

(Continued)

FOREIGN PATENT DOCUMENTS

CA    2390701        5/2002
WO    PCT/US00/30786  11/2000

OTHER PUBLICATIONS

Wegner et al., The External Heapsort, IEEE Transactions on Software Engineering, vol. 15 issue 7, Jul. 1989, p. 917-925.*

(Continued)

*Primary Examiner* — Greta Robinson
(74) *Attorney, Agent, or Firm* — Symbus Law Group, LLC; Clifford D. Hyra

(57) ABSTRACT

An method for searching a database and sorting the results of a search to identify important, authoritative, and seminal records and to bring them to the front of the search result. The method comprises a means of rapidly identifying references to other records within each record and an algorithm that uses those references to identify the seminal, authoritative, and important cases. The invention may be used in legal research, permitting researches to find additional seminal documents that are missed by a standard Boolean search and to sort search results by seminality so that they can rapidly find the seminal case in an area of law.

25 Claims, 5 Drawing Sheets

(56) References Cited

U.S. PATENT DOCUMENTS

| | | | |
|---|---|---|---|
| 6,014,677 A * | 1/2000 | Hayashi et al. | 707/104.1 |
| 6,026,388 A * | 2/2000 | Liddy et al. | 707/1 |
| 6,088,692 A * | 7/2000 | Driscoll | 707/5 |
| 6,182,091 B1 * | 1/2001 | Pitkow et al. | 715/501.1 |
| 6,233,571 B1 * | 5/2001 | Egger et al. | 707/2 |
| 6,289,342 B1 * | 9/2001 | Lawrence et al. | |
| 6,389,436 B1 * | 5/2002 | Chakrabarti et al. | 715/513 |
| 6,438,543 B1 * | 8/2002 | Kazi et al. | 707/5 |
| 6,457,028 B1 * | 9/2002 | Pitkow | G06F 17/3061 707/999.005 |
| 6,631,496 B1 * | 10/2003 | Li et al. | 715/200 |
| 6,665,656 B1 * | 12/2003 | Carter | 707/3 |
| 6,665,665 B1 * | 12/2003 | Ponte | |
| 6,738,780 B2 * | 5/2004 | Lawrence et al. | 707/101 |
| 6,789,075 B1 * | 9/2004 | Nielsen | 707/5 |

OTHER PUBLICATIONS

Taniar et al., Parallel Double Sort-Merge Algorithms for Object-Oriented Collection Join Queries, High Performance Computing on the information Superhighway, 1997. HPC Asia '97, Apr. 28 through May 2, 1997, pp. 122-127.*

International Search Report for PCT/US00/30786, More Efficient Database Research System, Applicant Edward J. Walters, Filed Nov. 9, 2000.

Printout from http://web.archive.org/web/19911128214815/www.google.com/pressrel/pressrelease4.html of article, "Google's New GoogleScout Feature Expands Scope of Search on the Internet," Sep. 21, 1999, downloaded via the World Wide Web on Jan. 20, 2003.

* cited by examiner

RELEVANCE SORTING FOR DATABASE SEARCHES

RELATED APPLICATIONS

This application claims priority under 35 U.S.C. §119 to provisional application No. 60/164,549, filed Nov. 10, 1999, the entirety of which is incorporated herein by reference. This application also relates to co-pending application Ser. No. 09/707,910, filed on even date herewith, entitled "Apparatus and Method For Displaying Records Responsive to a Database Query," the entirety of which is incorporated herein by reference.

FIELD OF THE INVENTION

The present invention relates generally to the field of searching and sorting databases, and more particularly to devices and methods for searching and sorting records and parts of records in databases of legal materials.

RELATED ART

For centuries, researchers have pored over books, reading document after document to inform their knowledge of certain fields. This kind of research is both time-consuming and cumbersome. Researchers frequently have to review documents that are not on point, and often fail to identify or locate relevant documents. With the advent of computers, companies have created voluminous searchable databases of research materials. Research materials can comprise files in various formats, from unstructured strings of characters, sentences, or text files, to very highly structured data. They can be of a wide variety of data classes, such as words, numbers, graphics, etc. In a computerized search, the user enters a search query, usually using "keywords" or Boolean search terms, and the computer system responds by presenting a list of documents in the database that meet the requirements of the search. The term "keyword" refers to any term or searchable element, including special topical words. The user can then review responsive documents, search within that subset of responsive documents, or conduct another query. Research of this sort generally takes place on a local computer system, on compact discs or other storage devices, over a dial-up modem connection, and more recently via the Internet.

One great advantage of searching databases by computer is that the user may determine how broadly or narrowly to conduct text searches. Thus, to a certain extent, the user can control the number of documents returned in response to a query. This is especially helpful because queries often return hundreds, or even thousands, of responsive documents. To be thorough, researchers frequently must review each and every one of these documents. One example of this type of text retrieval system is the "Lexis/Nexis" system operated by Anglo-Dutch conglomerate Reed-Elsevier.

Despite great advances in computer-assisted research, reviewing documents responsive to a search query remains time consuming, inefficient, and dreadfully dull. Searches yield sets of responsive documents that are both underinclusive and overinclusive. All too often, queries fail to return relevant documents because the documents are not literally responsive to a user's Boolean request, as well as irrelevant documents because they are merely incidentally responsive. In order to tell whether a query was well formulated, researchers must often review scores of responsive documents one document at a time. The user may be required to review every document in a long list of responsive documents in order to guarantee the comprehensiveness of the research assignment. Many times, reviewing documents responsive to a query is akin to looking for a needle in a haystack.

Leaders in the computerized research industry, such as Westlaw and Lexis/Nexis, usually sort search results in order of authority. For example, documents from the most authoritative sources are displayed first, and within each source, the documents are sorted in reverse chronological order. Other research systems sort search results according to "relevance," which typically means displaying documents that contain the most instances of the search terms first.

Unfortunately, research systems of today often fail to identify the most relevant documents because they rely on very simple and sometimes highly inappropriate counting algorithms to determine whether and to what extent a document is relevant. These systems simply count, for example, the number of times a certain word or group of words appears in a document and simply display the results according to count. But the number of times a word or a group of words appears in a document alone often does not determine the document's relevance. So research systems that rely on simple counting algorithms to determine relevance frequently fail to recognize and identify some of the most important, influential, popular, authoritative, or seminal records in a database or a group of databases. Thus, the quality and comprehensiveness of the research is seriously undermined.

Accordingly, there is a need recognized by inventors in several industries, including but not limited to the legal research industry, for an efficient and reliable way to sort and display responsive documents not only according to relevance, but also according to importance, popularity, authoritativeness, or seminality.

SUMMARY OF THE INVENTION

The present invention is directed to a method for identifying, sorting and displaying records that are important to a user's search request. In one aspect of the invention, the method comprises the steps of: (i) creating a look-up table, which is an organized concordance of most or all elements in a database (including without limitation: records, fields, words, numbers, citations, illustrations, and the like), said look-up table to include information describing each element in the database; (ii) entering a search query for the database, including preferences about how the results should be sorted, such as by popularity, authoritativeness within the database, or authoritativeness among responsive records; (iii) searching the database or set of databases (hereinafter sometimes referred to as "a third set of records") for records based on the user's criteria; (iv) comparing the records returned by the search (hereinafter sometimes referred to as "a first set of records") to the entries for those records in the look-up table; (v) sorting records returned by the search according to information in the look-up table or information in other look-up tables; (vi) displaying a list of records responsive to the query, sorted according to the user's preference.

In another aspect of the invention, a method for sorting a set of records is provided. This aspect of the invention comprises the steps of detecting the number of times a component of each record in a first set of records is referenced by records in a second set of records, and sorting the first set of records based upon that number.

In a further aspect of the current invention, a method for sorting a set of legal documents is shown. This aspect of the invention comprises the steps of detecting the number of times each legal document in a first set of legal documents is cited by legal documents in a second set of legal documents, and sorting the first set of legal documents in an order based upon that number. In a particularly preferred embodiment of the invention, the second set of records (or legal documents, as the case may be) is first divided into "classes" and assigned predetermined weights to reflect the scope and/or importance of each member of the set.

In yet another aspect of the current invention, a method for identifying additions to a list of records is provided. This aspect of the invention comprises the steps of counting the number of times a record not identified in the list is referenced by the members of the list, and adding to the list an identifier for each record for which the number exceeds a predetermined value.

In one preferred embodiment of the invention, records are sorted according to their authoritativeness within the database. A look-up table is created that lists, for every record in the database, all references to the record in question. For example, if record number 10 were cited three times in the database, the lookup table would read: 10: 3. In a further preferred embodiment, the look-up table lists the number and/or the location in the database of each such reference to the record in question. In the above example, if record number 10 were cited three times, in record 2 at character 56, record 20 at character 345, and in record 83 at character 182, the table could contain the entry 10: 3:: 2(56), 20(345), 83(182).

The search results are sorted using the total number of references to the record, so that the records referenced most frequently are displayed first in the list of responsive cases. For example, if a database had 100 records and the search of step (iii) returned 3 records, the algorithm would locate the three records in the look-up table, identify the table entry corresponding with the total number of references made to each document, compare the entries, and display a list of the records sorted by that total number. If the first record were referenced 4 times, the second 24 times, and the third 8 times, the search results would be sorted record number 2, then 3, then 1.

In another embodiment of the present invention, records are sorted according to their authoritativeness within the set of responsive records only. In this embodiment, the database is searched as in steps (i)-(iv) above, returning a set of records responsive to the search and identifying those records in the look-up table. Instead of using the total number of references to the list of responsive records, the algorithm would read down the list of all references, but only count references within documents returned by the query and sort the responsive records accordingly.

For example, if a query returns 5 responsive records, records number 10, 20, 30, 40, and 50, the algorithm would locate record number 10 in the look-up table, then review the list of all references to document 10 in the database. If the total number of references were 3, that entry might look as follows: 10: 3:: 2(56), 20(345), 83 (182). In the preferred embodiment, however, only one reference would be counted, the reference in document 20 at character number 345, because of the referencing records (records 2, 20, and 83), only record 20 was originally returned by the search. The algorithm would then repeat this process for records 20, 30, 40, and 50. Because records returned by the search will generally share a tighter topical nexus than records in the database generally, this "closed loop" relevance algorithm counts references with a greater probability of being germane to the research task at hand, factoring in the quality of the reference instead of the raw quantity.

In yet another aspect of the present invention, an additional measure is used to identify germane references to records returned in a search, namely only counting references within a specified proximity of one or more of the search terms. For example, with a text database searched for particular search terms, references would only be counted if they came within n words (n being an integer) of any of the search terms. (If the query included proximity operators, for example "brown/10 cow," an alternative embodiment would only count the reference if it appeared within n words of the appearance of "brown" or "cow" if the proximity condition was satisfied). For example, assume a text database contains 50 documents and is searched for the word "cow" and further assume that 7 documents are returned by the search. References to the 7 documents would only be counted if, for example, they were within 25 words of an appearance of "cow" in each referencing document. Sorting would then occur as before, i.e., in accordance with steps (iv) through (vi) described above.

In a further aspect of the invention, documents not literally responsive to the search query, but nonetheless relevant to the research task, are identified. Where the algorithm determines that a certain number or percentage of records reference a record not returned by the search, the algorithm identifies that record for the user. In this embodiment, the look-up table of step (i) includes, for each record, a list of each reference that record makes to all other records in the database. In the example above, if record 10 is cited three times in the database, and record 10 itself cites two other records, the look-up table entry could read: 10: 3:: 2(56), 20(345), 83 (182):: 45(8643), 58 (4003). When the user conducts a search, the algorithm counts the number of references that the responsive records make to other records in the database. If this number of references for any record in the database that is not in the search result exceeds a certain threshold, that record is identified as another important or seminal record that was missed by the original search.

For example, assume a search of 100 records that returns five records: 10, 20, 30, 40, and 50. Suppose further that the look-up table reveals that four of these five records cite record number 83. If the threshold were set at three references, or using an alternative threshold, citation by 50% of the responsive records, then record number 83 would be identified as potentially germane to the search.

In another aspect of the invention, additional seminal or important records are identified by the algorithm described in the preceding paragraph, with the modification that references to other records in the database or set of databases are counted only if those references fall within a specified proximity of the characters, words, or features that were identified in the record which resulted in its inclusion in the search result.

In a further aspect of the invention, each reference to a record is weighted by a secondary criteria, such as the authoritativeness of the citing reference. For example, United States Supreme Court cases may be given twice the weight of cases from a federal court of appeals.

In yet a further aspect of the invention, the algorithm ranks records according to their popularity. In this aspect, the look-up table in step (i) includes, for each record in the database, information about the number of times that record has been delivered to users of the system, including but not limited to page views, print requests, faxes, or downloads. For example, if record 10 had been printed 456 times, its entry in the look-up table could read 10: 3:: 2(56), 20(345), 83 (182):: 456. Indexing and searching would be conducted as in steps (i)-(iv) above, then the algorithm would compare the number of deliveries of the record and sort the documents in order of popularity, thus computed.

In another aspect of the invention, all references in all records in the database or set of databases are identified in Extensible Markup Language (XML) for easy identification for use with any embodiment of the invention. In another aspect of the invention, all references in all records in the database or set of databases are identified in hypertext markup language (HTML) for easy identification for use with any embodiment of the invention. In another aspect of the invention, all references in all records in the database or set of databases are identified in standard generalized markup language (SGML) for easy identification for use with any embodiment of the invention.

In another aspect of the invention, separate look-up tables are constructed for different types of information collected about each record. In a separate embodiment, all of the information is combined in a single look-up table. In an alternative embodiment, look-up tables are not constructed at all, and all information otherwise kept in the look-up table of step (i) is calculated "on the fly" by a separate search of the entire database or subsets therein.

All embodiments of the invention may be practiced together or apart. An example of practicing multiple embodiments together is provided by combining "closed loop" relevance with popularity sorting. In one embodiment of this combination, the records are ranked separately by each algorithm. The ranking as computed by each method is then averaged to get the final ranking. For example, if a record was placed $3^{rd}$ by one method and $27^{th}$ by the other, it would be ranked $15^{th}$ by the combined method (because $(27+3)\div2=15$). Fractional rankings could be rounded up or down. Also, in a preferred embodiment, an algorithm is added to resolve ties in rankings. For example, in cases where two or more records have the same rank, the most recent document can be displayed first. In another embodiment of this combination, a composite index is created. In one embodiment, the indices for each relevance algorithm is normalized to one and then the composite index is the sum of the two separate indices. For example, assume there are three records representing three documents, A, B, and C, to be ranked by closed loop relevancy and by popularity. Further assume that document A is cited by B and C, document B by C, and document C is not cited by A or B. In this case, the closed loop index (or "score") for document A is 2, for B it is 1 and for C, it is 0. Dividing by the largest closed loop index normalizes these values. Thus, the indexes for A, B, and C are 1, 0.5, and 0, respectively (because $2\div2=1$, $1\div2=0.5$, and $0\div2=0$). Assume further that for popularity, the number of prior print jobs is used as an index and that A has been printed 7 times, B 9687 times and C 5421 times. The normalized values are 0.0007, 1, 0.5596 (because $7\div9687=0.0007$, $9687\div9687=1$, and $5421\div9687=0.5596$). Closed loop relevance would rank the documents in the order A, B, C. Popularity would rank them C, B, A. The composite relevancy ranking would be based on the values 1.0007, 1.5, 0.5596 for A, B, and C, respectively (because $1.0+0.0007=1.0007$, $0.5+1=1.5$, and $0+0.5596=0.5596$). Thus, the documents would be ranked B, A, C.

Features and Advantages of the Present Invention

It is a feature of the present invention that seminal records upon which future records rely are identified and brought to the top of a search result.

It is a further feature of the present invention that one can distinguish records that are seminal, authoritative, or otherwise important for a particular issue from records that are generally authoritative, important or seminal. This is accomplished by only counting references from within a search result, because these records are pre-selected by the original search to deal with that issue. Demanding that references have a certain proximity to elements used in the original search further enhances this feature of the invention.

It is a further feature of the present invention that one can sort records by their popularity. This sorting feature allows the system to "learn" about records in the database from usage patterns and recommend records in subsequent searches.

It is yet another feature of the present invention that the seminal or important record can be found very quickly because a prior look-up table was constructed in accordance with a preferred implementation of the invention, obviating the need for a search of an entire database. It is a further feature of the present invention that these records and references may be identified quickly through the use of HTML and/or XML and/or SGML tagging.

It is an advantage of the present invention that it allows additional important or seminal records to be identified that were missed by the original search of the database or databases. Imperfect search queries commonly exclude records germane to the research task. The present invention identifies these records quickly where they might only otherwise be found by comparing the references of every responsive record.

Additional features and advantages of the present invention are set forth in part in the description that follows, and in part are apparent from the description, or may be learned by practice of the invention. The features and advantages of the invention may also be realized and attained by means of the instrumentalities and combinations particularly set out in the appended claims.

BRIEF DESCRIPTION OF THE FIGURES

The accompanying drawings, which are incorporated in and constitute part of the specification, illustrate preferred embodiments of the invention, and, together with the description, serve to explain the principles of the present invention. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

Figure 1:
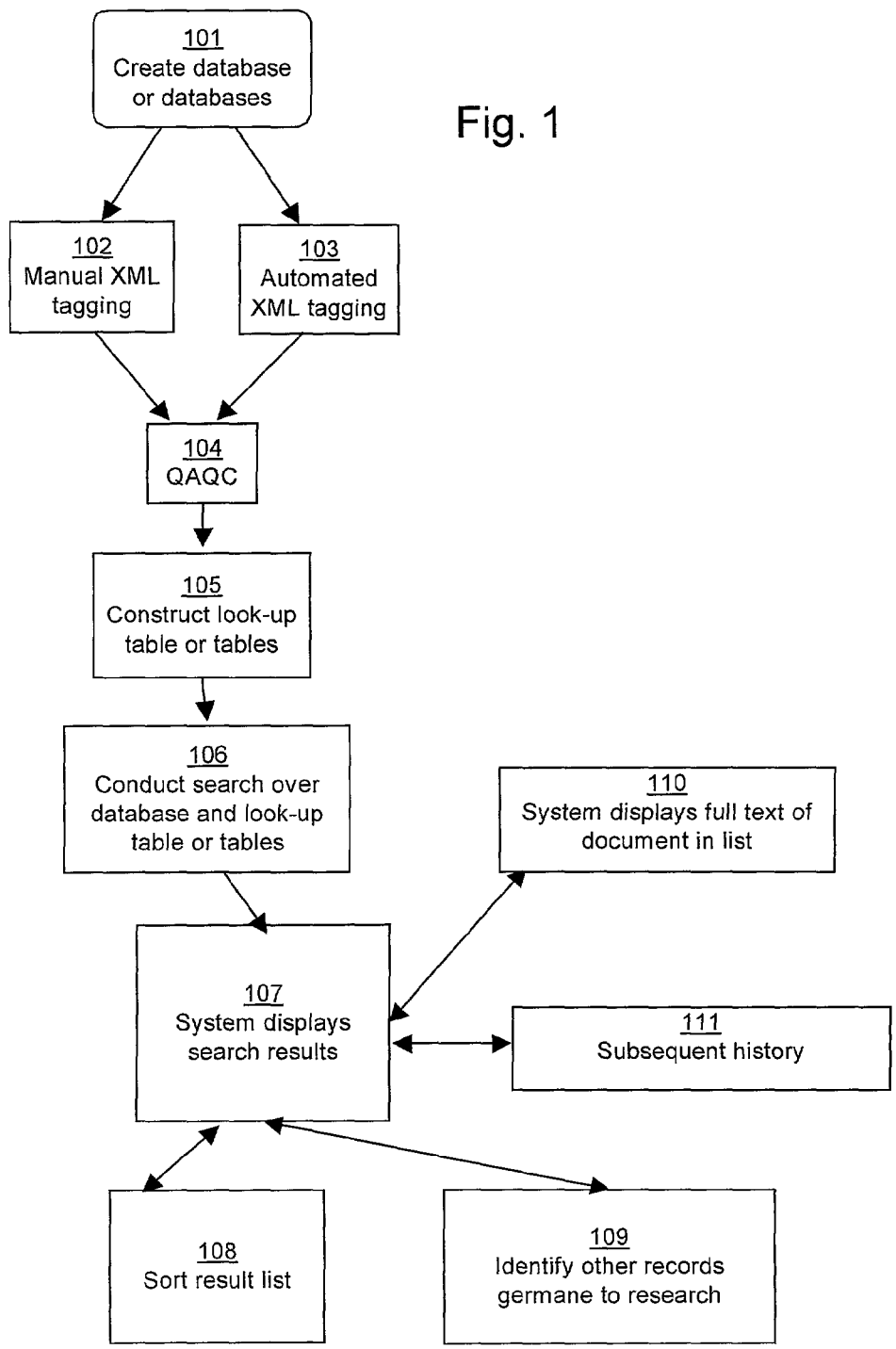
FIG. 1 depicts a flow diagram illustrating one embodiment of the present invention.

Reference will now be made in detail to preferred embodiments of the invention, examples of which are illustrated in the accompanying drawings. Notably, the present invention may be implemented using software, hardware or any combination thereof, as would be apparent to those of ordinary skill in the art, and the figures and examples below are not meant to limit the scope of the present invention or its embodiments or equivalents.

Overview of the Present Invention

Currently, there is no automated way to identify authoritative cases, statutes or regulations when conducting legal research. Using state-of-the-art search technologies, researchers are often presented with a list of hundreds of records which generally are sorted first by the political authority of the authoring institution and then in date order, most recent documents first. The researcher must skim all the documents to find the authoritative ones, those that are relied upon by future courts. These are typically older documents, and therefore tend to fall near the end of the search result, so that the researcher often will not find them until after skimming hundreds of other documents. Furthermore, it is not uncommon that the most authoritative case is missing from the search result altogether. This happens because the case predates the date range of the search, because it is from a different court and the case resides in a different database that was not searched, or because the authoritative case uses different terminology than modern cases and the researcher did not search using the more archaic terminology.

Similarly, researchers have no access to potentially important information about aggregate usage patterns within the database that would help identify the most popular cases in certain topics. In a list of 500 cases, for example, one document might have been printed ten times as many times as the next most popular document. This provides to researchers a different measure of authority: the revealed preferences of previous users.

The present invention permits legal researchers to rapidly find the most authoritative documents for their topic of research. In one aspect of the invention, it permits them to sort a long list of cases, statutes, regulations, or administrative materials to bring to the top the documents that have subsequently been relied upon by later courts, legislators, agencies, and other users. It also permits legal researchers to find additional authoritative documents that they might have missed in their original search.

First, a set of databases of legal materials is created. For example, one might have a database of United States Supreme Court cases, a database of cases for each of the federal courts of appeal and a database or set of databases of cases for each state court. The databases may be stored in an Oracle database system or other architecture as known to one skilled in the art.

In one preferred embodiment, all citations to other records are "tagged" using XML tagging. The tagging may be automated as follows: First citations must be identified by searching for common text in citations, such as "F.2d," "F.Supp.," or "v." To enhance the accuracy of the searching, the text around said common text is examined for consistency with common citation form. For example, one checks that numbers precede "F.2d" and that proper names or other capitalized words fall in close proximity to "v." Finally standard tags known to one skilled in the art are placed around the citation. In addition, each citation could be given a unique identifying tag. To confirm the accuracy of the tagging and the case identifications, manual proofing may be done to check that the entire citation and no more is contained within the tags. In a further embodiment, these citations also would be connected by hypertext links to the documents they cite.

In another preferred embodiment, each document in the database is given a unique numerical identifier and two citation tables are constructed. Each table has a row for every record in the database labeled by that record's unique identifier. In addition, each record contains the proper citation for that record, such as "*United States v. Jones,* 253 F.2d 1243 (3rd Cir. 1984)." The first table would list all documents cited in the case *United States v. Jones*. For each such record, a search is conducted through that record for XML tags identifying other citations. The unique identifier for the cited document, along with the position of the citation in the case is noted. For instance, in the *United States v. Jones* example noted above, the record might be identified as record number 34,536 and it might contain citations to "*Parker v. National Toothpick Ass'n,* 265 F.Supp. 586 (N.D.N.Y. 1978)" after character word 964 and to "*Smith's Cafeteria v. Purina,* 218 U.S. 933 (1944)" after word 894. If Parker was identified as document number 59,040 and Smith's Cafeteria had identifier 82,588, the entry for *United States v. Jones* in this table would be "34536*:: United States v. Jones,* 253 F.2d 1943 (3rd Cir. 1984):: 59040(964), 82588(894).

The second table contains a count and pointer to every other record in the database that cites to a given record, in the example above, the documents that cite to *United States v. Jones*. To follow this example, if *United States v. Jones* was also cited by three cases 23,334, 38,850, and 49,532 at positions 998, 353, and 634, respectively, its entry in this table would read: "34536*:: United States v. Jones,* 253 F.2d 1943 (3rd Cir. 1984):: 3:: 23334(998), 38850(353), 49532(634). This table could be constructed in a number of ways. In one embodiment, the database is searched for references to each case. In another, the first table is used to construct the second. To build the entry for case 30603, one searches the entire first table for 30603, recording each case for which it is listed. In a further embodiment, the two tables are combined into a single table containing all information about a given record.

In another preferred embodiment, the look-up table includes a tally of the number of times users have requested delivery of a document, including without limitation, inclusion in a search result, page views, printing, faxing, and/or downloading. In a further embodiment, the look-up tables are combined into a single table containing all information about a given record.

In yet another preferred embodiment, the above tables and tagging are used to sort search results. First the user specifies a Boolean or other search, such as natural language searching, and selects databases and date ranges over which to search. A set of cases or other legal documents are then retrieved in any of a number of standard ways known to one skilled in the art. In one preferred embodiment, the search results are sorted based upon the number of times other cases in the database cite those documents. Cases that are cited more often are placed at the top of the list. To quickly determine how many cases cite a given case, the second table described above is used.

In another preferred embodiment, citations are only counted if they are from cases that are part of the search result. This is done to identify cases that are germane to the research task at hand, preferring quality of citations to quantity. A case may be cited by other documents for a host of reasons, many unrelated to the research query. To better assure that the document's authority is related to the research task, the search algorithm counts only citations within the tighter topical nexus of those documents responsive to the search.

One way of accomplishing this is to compare the second citation table to the list of documents responsive to the search. The algorithm counts citations from the look-up table only if the record is among the list of search results. Search results are then sorted by these numbers. In another preferred embodiment, one only counts a citation if it is within a certain number of words, for example 25, of the user-supplied search terms, which further enhances the likelihood that authority as computed is germane to the research topic.

In another preferred embodiment of the invention, citations are weighted by the level of the court that is citing the document. In this embodiment, for example, the system would assign higher values for citations by the United States Supreme Court than it would assign to citations by a federal court of appeals. And citations by federal appeal courts would, in turn, receive higher values than citations by a lower court.

A further preferred embodiment is to identify additional authoritative cases that were not literally responsive to the user's search, by determining which cases are cited by many cases in the search result but are not part of the search result. To do this, the system constructs an array of counters using the first citation table described above. For each case in the search result, one examines all the citation identifiers in the first citation table. If the identifier is not part of the search result, it is added to the array of counters and a counter is associated with the identifier, starting at the number one. If the identifier already appears in the array, the corresponding counter is incremented by one. After all the citations by all the cases in the search result have been considered, additional seminal or authoritative cases are chosen as those for which their corresponding counter exceeds particular threshold. In one embodiment, for example, a threshold of above 10% of the total number of cases returned by the original search result could be used. It is normally the case, but not necessary, that this method finds records that are relevant to the search query and that the set of records to which the found records is added are related in some way to one another.

In an alternative preferred embodiment, the counts are weighted according to the authority of the citing body. Further preferred embodiments are described in the provisional application No. 60/164,549, to which this application claims priority, and which is incorporated herein by reference.

FIG. 1 illustrates the general workflow process of creating the invention and a few preferred embodiments thereof. First, a database or multiple databases of digital legal content (referred to as the "second set of records" in one embodiment, or the "second set of legal documents" in another) are created in step 101. This may be done by compiling electronic documents that are already in electronic format, creating electronic documents by data conversion, or any other method of data entry. Next, in a step 102, XML tags are added to the documents either manually, wherein each tag is inserted by a typist, electronically, wherein scripts are written that automatically insert tags in the proper places, step 103, or by some combination of the two. In the preferred embodiment, the tagging process is submitted to rigorous quality assurance/quality control procedures (QAQC). See step 104. Next, unique identifiers are created for each record, and a first look-up table or a first look-up table and a second look-up table are created from the tagged documents in step 105. The system then conducts searches over the look-up table or tables, step 106, and the system then displays a list of search results, referred to as a "first set of records", "first set of legal documents", or "responsive documents," step 107.

The system provides for a number of sorting algorithms to make research tasks more efficient. Examples include sorting algorithms that bring certain types of documents to the top of the list, step 108, and algorithms that identify documents that are not in the set of search results, but are nonetheless germane to the research, as shown in step 109. The invention also allows the user to display the full text of any document in the list, step 110, or to check the subsequent history of any document, as shown in step 111.

Figure 2:
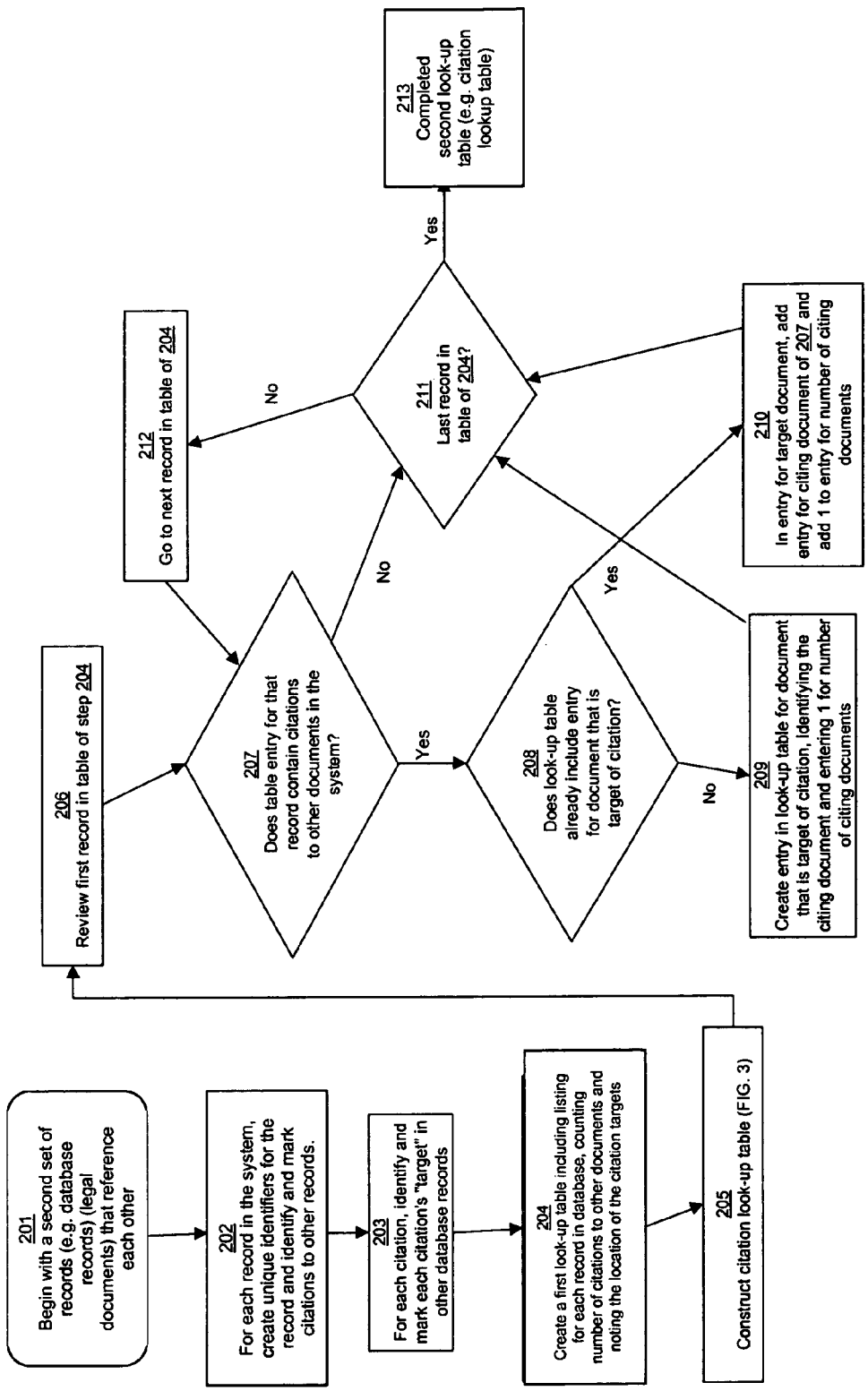
FIG. 2 depicts a flow diagram illustrating an alternative embodiment of the present invention in which a citation look-up table is used.

FIG. 2. is a flowchart illustrating the steps involved in the formation of the citation look-up table. The process begins, in step 201, with a database of records that reference each other (hereinafter sometimes referred to as "a second set of records"). For each record in the system, citations (hereinafter sometimes referred to as "identifiable text") to other records are identified (hence said records have unique identifiers) and marked, step 202. Next, each citation's "target" in other database records is identified and marked, shown in step 203. Then, in step 204, a table (hereinafter sometimes referred to as "a first look-up table") is created that includes three pieces of information for each record in the database: (i) information identifying the record; (ii) the number of times it cites other documents; and (iii) for each such citation the identification for the document it references and location of each citation targets.

From this data, a citation look-up table (hereinafter sometimes referred to as a "second look-up table") is created in step 205 in the following way. In step 206, the system reviews the entry for the first document in the table from step 204 and any other database documents it cites. The table entry for that record may or may not indicate citations to other documents in the system, step 207. If it does, the system determines whether the look-up table already includes an entry for the document that is the target of the citation. See step 208. If not, the system creates an entry in the look-up table for the document that is the target of the citation, identifying the citing document and entering 1 for the number of citing documents. See step 209. If the look-up table already includes an entry for the document, the entry for the citing document of step 207 is added and the entry for number of citing documents is increased by one (1), as in step 210. If, at step 207, the table entry for the record does not contain citations to other documents in the system, or once step 209 or step 210 have been completed, the system determines at step 211 whether the entry considered most recently from the table of step 204 is the last record in that table. If it is not the last record, the system goes to the next record in the table, step 212 and processing returns to step 207. If it is the last record, then the citation look-up table has been completed. See step 213.

Figure 3:
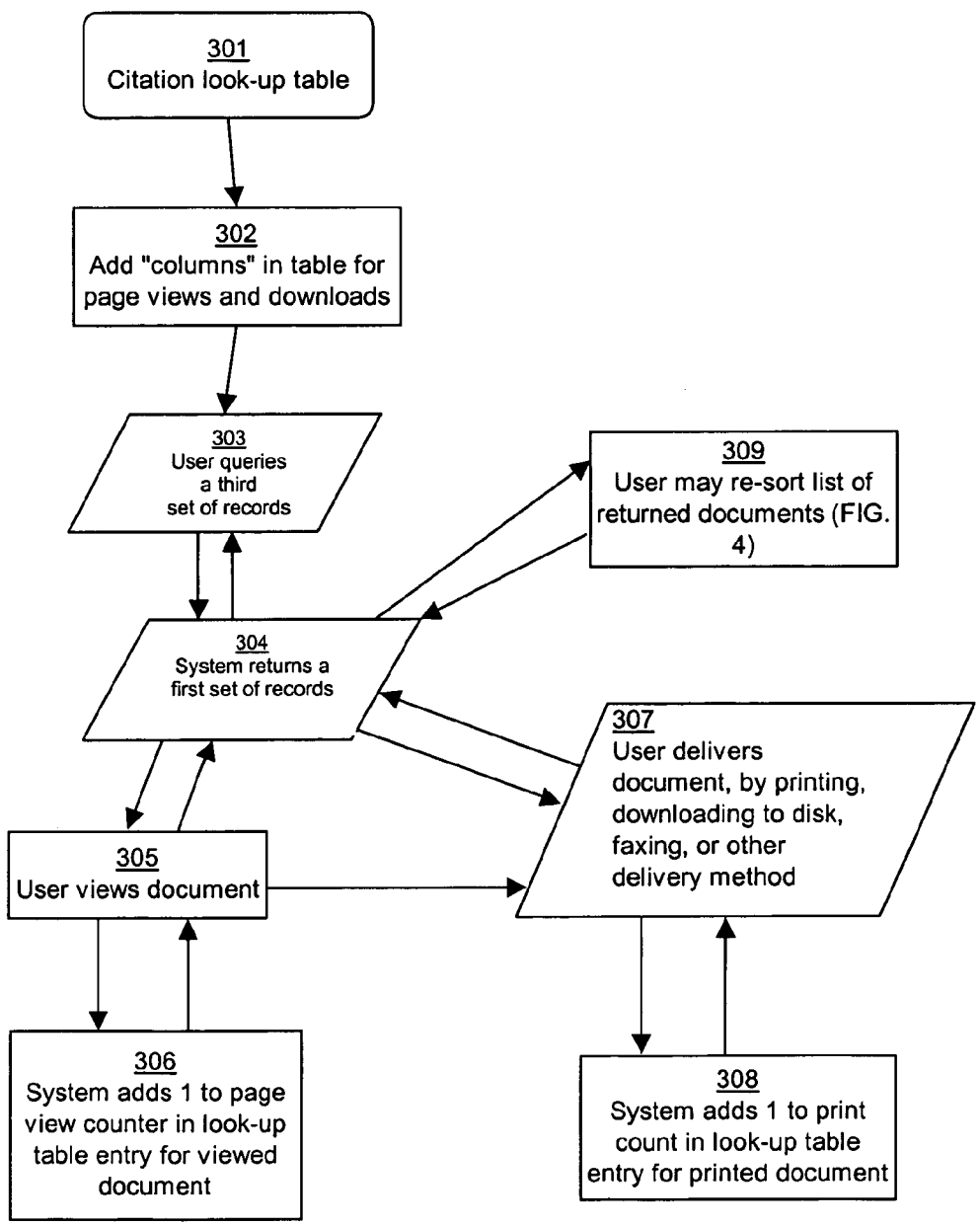
FIG. 3 depicts a flow diagram illustrating another embodiment of the present invention which tracks user experience data, preferences and associations.

FIG. 3 is a flowchart illustrating the steps for tracking user-experience data or user preferences and associations in the system to enhance searching and sorting, either in the same look-up table of step 213 or as a separate look-up table. These preferences may be tracked in a number of ways. In one preferred embodiment, preferences are tracked by counting the number of times a document is viewed by users or delivered to users (e.g. printed, faxed, downloaded, or delivered by some other method). Once a citation look-up table has been created (either as in FIG. 2 or otherwise) 301, two fields or "columns" must be added: one that tracks page views, another that tracks deliveries 302.

The user preferences are gathered during searching, sorting, and document delivery in the system. In one such iteration, the database (a "third set of records") is queried at step 303, and a list of responsive documents (a "first set of records") is returned, step 304. From this point, the user may choose to re-sort the list of responsive documents, step 309, using any of the methods described below with reference to FIG. 4. Alternatively, the user may choose to view the full text of one of the responsive documents, step 305, or deliver a document by printing, downloading, faxing, or via another delivery method, step 307. If the user views the full text of the document, step 305, the system increments the page view counter in the look-up table entry for the viewed document. See step 306. If the system delivers the document to the user in any of the ways described herein, the system increments the print count look-up table entry for the delivered document. See step 308.

Figure 4:
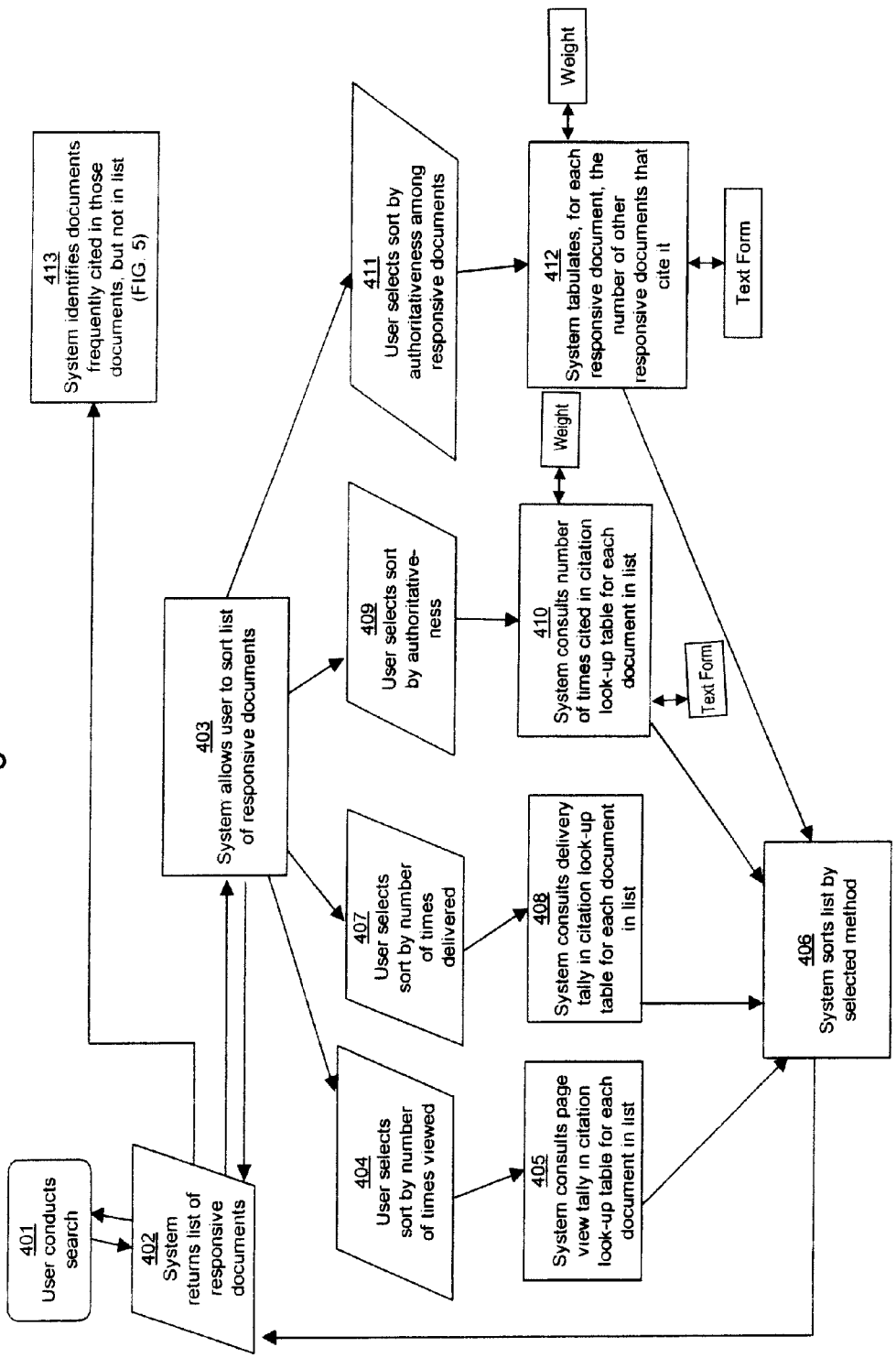
FIG. 4 depicts yet another flow diagram illustrating various ways of sorting lists of responsive documents according to the present invention.

FIG. 4 is a flowchart illustrating sorting features that make research more efficient. First, at step 401, the user conducts a search. The system returns a list of responsive documents, step 402. This list may be re-sorted, step 403, in a variety of ways.

In one embodiment, the list is sorted by the number of times each document has been viewed by other users (Step 404), as described in step 306. In this case, the system consults the page view tally in the citation look-up table for each document in the list created in step 405, and returns the list created in step 402 sorted by this number.

In another embodiment, the list is sorted by the number of times each document has been delivered to other users (Step 407), as described in step 308. The system consults the delivery tally in the citation look-up table for each document in the list, step 408, and returns the list created in step 402 sorted by this number.

In yet another embodiment, the list is sorted by the number of times that other records in the database cite to the documents in the list created by step 402, or "authoritativeness" (Step 409). The system determines how many times each document is cited by other documents in the database (Step 410), and sorts the list accordingly (Step 406).

And finally, in yet another embodiment, the list may be sorted by authoritativeness among other responsive documents as shown in step 411. The system computes, in step 412, the number of times each returned document in the list created by step 402 is cited by other returned documents, and sorts the list created in step 402 accordingly.

In a preferred embodiment, the ranking of steps 410 and 412 may be enhanced by including multipliers to enhance the authority of documents cited by the most authoritative institutions, such as the U.S. Supreme Court.

The system also identifies documents that may be germane to the research task, but for whatever reason were not returned by the query to the system, step 413. In a preferred embodiment, the system locates documents that are frequently cited by the responsive documents of list, step 402, but are not themselves a part of the list of returned documents. This process is described and illustrated in FIG. 5.

Figure 5:
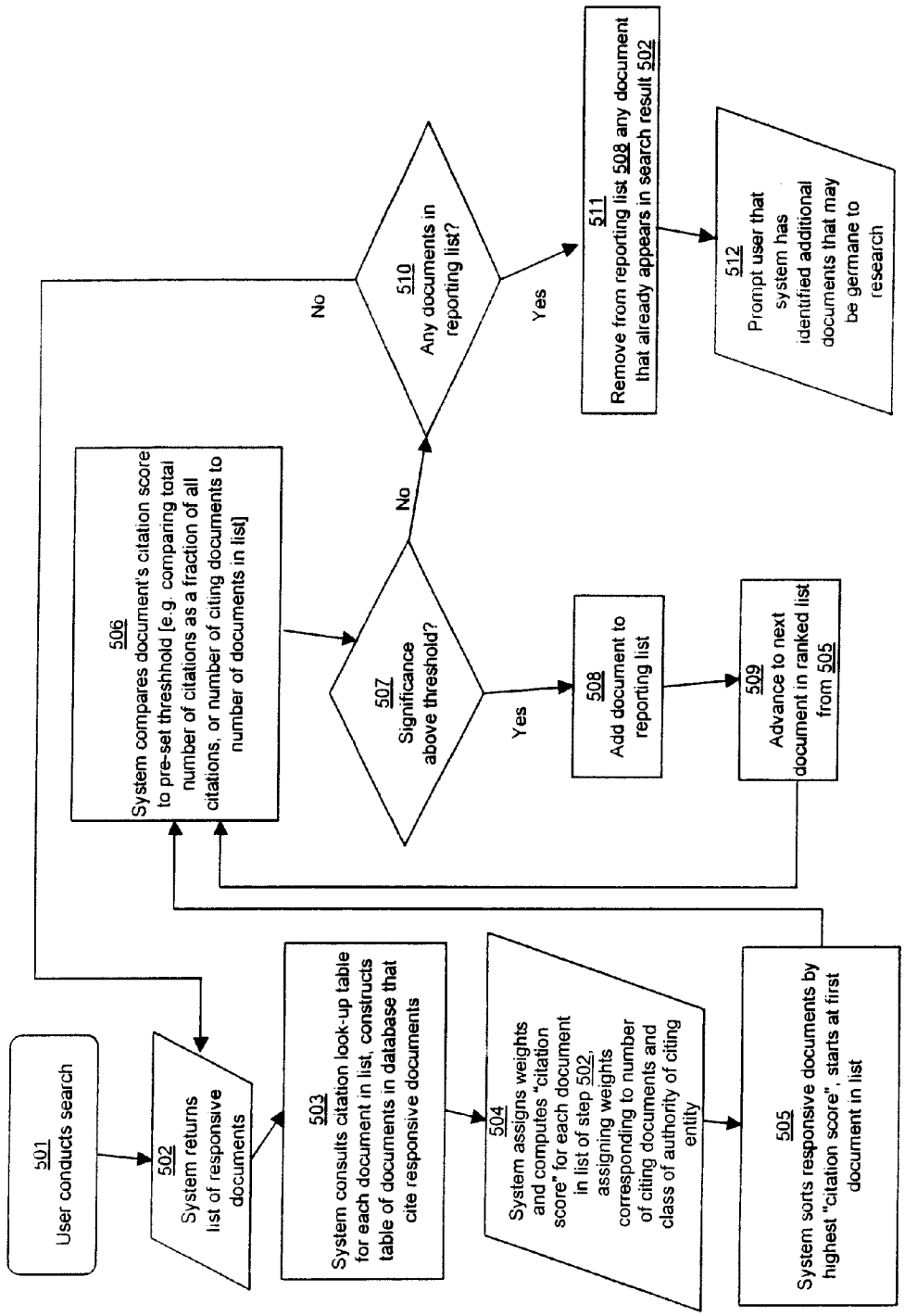
FIG. 5 depicts a flow diagram illustrating a preferred embodiment for identifying previously unidentified documents.

FIG. 5 is a flowchart illustrating how the system identifies documents that are not literally within the scope of a search, but might nonetheless be germane to the research task. First, the user conducts a search, step 501, and the system returns a list of responsive documents, step 502. Each document in the list created in step 502 cites a host of others, and step 503 organizes information about those citations. For each document in the list, the system consults the citation look-up table of FIG. 3 and creates a new list of cited documents. See step 503. Next, the cited documents of the list created in step 503 are ranked, with the most frequently cited documents first, step 504. Thus from the list of documents responsive to the user's search, the system creates a separate table of all other records cited by that original list. See step 503.

Beginning with the first document in the list created by step 503, the system computes, at step 504, the significance of the number of citations. In one preferred embodiment, the system creates a "citation score" using an algorithm that divides the number of times a document in the list created by step 503 is cited in the responsive documents of list from step 502 by the total number of citations in the documents of list 502 to all other documents in the system. In another preferred embodiment, the system creates a citation score using an algorithm that divides the number of documents of the list created by step 502 that cite to a particular document in the list created by step 503 by the number of documents in the list created by step 502. In another preferred embodiment, the system guards against skewed citation scores using "p-norming" or other tools well known to those skilled in the art. As illustrated in FIG. 5, the system has thus resorted the list created by step 503 by citation score order, with the most often or most authoritatively cited documents at the top. See step 505.

Beginning with the first document in the list created by step 505, the system determines whether the cited documents are authoritative enough to identify them to the user. In a step 506, the system compares the citation score to a certain, pre-defined significance threshold. If the document's score exceeds the threshold (Step 507), the document is added to a list of documents to report to the user, or a "reporting list," step 508, and in a step 509, the system advances to the document with the next highest citation index in the list created by step 505. If the document's score does not exceed the threshold, processing continues to step 510. In step 510, if there are no documents in the reporting list, the system continues to display the list of responsive documents which have been displayed in the foreground since step 502.

For the first document in which the significance is not above the threshold in step 507, the system determines which documents from the reporting list created by step 508 to bring to the user's attention. In step 510, if there are documents in the reporting list, the system compares the reporting list created by step 508 to the original list of responsive documents created by step 502, removing any documents that are already part of the search result. See step 511. The system then alerts the user that it has identified a document not part of the search result that may be germane to the research task. See step 512.

The present invention has been disclosed and described herein in what is considered to be its most preferred embodiments. It should be noted that variations and equivalents may occur to those skilled in the art upon reading the present disclosure and that such variations and equivalents are intended to come within the scope of the invention and the appended claims.

What we claim is:

1. A computer-implemented method of sorting a set of records comprising a list of responsive documents returned by a search, said search including a step of performing a query, said method comprising the steps of:

for each record in said list of responsive documents, collecting, from a citation table, the number of times each said record in said list of responsive documents is referenced by records in another set of records;

wherein said another set of records is a set of records contained in a database;

sorting said list of responsive documents into an order based upon said number of times each said record of said list of responsive documents is referenced in records of said another set of records; and communicating results of said sorting step, in an order corresponding to the order in which records of said set of records are placed by said sorting step, to a user.

2. The method of claim 1 wherein the database is comprised of legal documents.

3. The method of claim 1 wherein the database and said another set of records are identical.

4. The method of claim 1, wherein said step of performing a query comprises the step of applying Boolean logic to a keyword.

5. The method of claim 1, wherein said records in said set of records contain identifiable text that is identified by a tag.

6. The method of claim 5, wherein said tag comprises a set of characters defined by Extensible Markup Language.

7. The method of claim 1, further comprising the step of displaying said number.

8. The method of claim 1, further comprising the step of:
creating, prior to said collecting step, a unique identifier for each record in said another set of records, and a first look-up table, wherein said first look-up table is configured for storing the unique identifiers of all records cited by said record.

9. The method of claim 8, further comprising the step of:
creating, prior to said collecting step, a unique identifier for each record in said another set of records, and a second look-up table, wherein said second look-up table is configured for storing the unique identifiers of all records citing said record.

10. The method of claim 9, wherein said second look-up table is further configured for storing a position within said citing records where each said record is cited.

11. The method of claim 9, wherein said second look-up table is further configured to store a number of times said record is cited by the other records in said another set of records.

12. The method of claim 9, wherein said first look-up table and said second look-up table are merged into one structure.

13. The method of claim 8, wherein said first look-up table is further configured for storing a position within said record where other records in said another set of records are cited.

14. The method of claim 1, wherein said set of records and said another set of records are the same.

15. The method as recited in claim 1 wherein content of said another set of records is the same as content of said set of records.

16. A computer-implemented method of sorting a set of records comprising a list of responsive documents generated by performing a query on a database, wherein said step of performing a query comprises the step of applying Boolean logic to a keyword, said method comprising the steps of:
for each record in said set of records comprising said list of responsive documents, collecting, from a citation table, a number of times each said record of said list of responsive documents is referenced by records in another set of records within a predetermined range of said keyword;

sorting said first set of records into an order based upon said number collected in said collecting step; and communicating results of said sorting step, in an order corresponding to the order in which records of said set of records are placed by said sorting step, to a user.

17. The method as recited in claim 16 wherein content of said another set of records is the same as content of said set of records.

18. A computer-implemented method of sorting a set of legal documents comprising a list of responsive documents generated by a search of at least a subset of a database, said search including a step of performing a query, said method comprising the steps of:
for each legal document in said list of responsive documents, collecting, from a citation table, a number of times each said legal document of said list of responsive documents is cited by legal documents in another set of legal documents comprising documents included in said database;

wherein said set of legal documents of said list of responsive documents is generated by performing a query on a database;

sorting said set of legal documents generated by performing said query in an order based upon said number; and communicating results of said sorting step, in an order corresponding to the order in which legal documents of said set of legal documents generated by performing said query are placed by said sorting step, to a user.

19. The method of claim 18, wherein the database is comprised of legal documents.

20. The method of claim 18, wherein the database and said another set of legal documents are identical.

21. The method of claim 18, wherein said step of performing a query comprises the step of applying Boolean logic to a keyword.

22. The method of claim 18, wherein said set of legal documents and said another set of legal documents are the same.

23. The method as recited in claim 18 wherein content of said another set of legal documents is the same as content of said set of legal documents.

24. A computer-implemented method of sorting a set of legal documents, wherein said set of legal documents is generated by performing a query on a database, wherein said step of performing a query comprises the step of applying Boolean logic to a keyword, said method comprising the steps of:
for each legal document in said set of legal documents generated by performing a query, collecting a number of times each said legal document is cited by legal documents in another set of legal documents comprising another set of documents included in said database within a predetermined range of said keyword;

sorting said set of legal documents generated by performing said query in an order based upon said number; and communicating results of said sorting step, in an order corresponding to the order in which legal documents of said set of legal documents are placed by said sorting step, to a user.

25. The method as recited in claim 24 wherein content of said another set of legal documents is the same as content of said set of legal documents.

\* \* \* \* \*